(12) United States Patent
Nguyen et al.

(10) Patent No.: US 8,749,375 B2
(45) Date of Patent: Jun. 10, 2014

(54) HANDS-FREE HOME AUTOMATION APPLICATION

(75) Inventors: Djung Nguyen, San Diego, CA (US); Andy Nguyen, San Diego, CA (US); Lobrenzo Wingo, San Diego, CA (US)

(73) Assignee: Sony Corporation, Tokyo (JP)

( * ) Notice: Subject to any disclaimer, the term of this patent is extended or adjusted under 35 U.S.C. 154(b) by 130 days.

(21) Appl. No.: 13/430,129

(22) Filed: Mar. 26, 2012

(65) Prior Publication Data
US 2013/0249688 A1 Sep. 26, 2013

(51) Int. Cl.
*G08B 1/08* (2006.01)
(52) U.S. Cl.
USPC .................. 340/539.13; 340/539.1
(58) Field of Classification Search
USPC ...................................... 340/539.13
See application file for complete search history.

(56) References Cited

U.S. PATENT DOCUMENTS

| | | | |
|---|---|---|---|
| 6,377,825 B1 | 4/2002 | Kennedy et al. | |
| 7,124,087 B1 | 10/2006 | Rodriguez et al. | |
| 7,796,024 B2* | 9/2010 | Lynn et al. | 340/506 |
| 2010/0159846 A1 | 6/2010 | Witkowski et al. | |
| 2010/0271193 A1* | 10/2010 | Gonzaga | 340/457 |
| 2010/0321151 A1* | 12/2010 | Matsuura et al. | 340/5.52 |
| 2011/0244928 A1 | 10/2011 | Cherpes et al. | |
| 2011/0279270 A1* | 11/2011 | Marckwald et al. | 340/545.1 |
| 2012/0022872 A1* | 1/2012 | Gruber et al. | 704/270.1 |

OTHER PUBLICATIONS

Control your LiftMaster (R) MyQ™-enabled garage door opener and house lights from anywhere in the world. Retrieved Jan. 20, 2012, published by The Chamberlain Group Inc. https://play.google.com/store/apps/details?id=com.chamberlain.android.liftmaster.myq&feature=also_installed#?t=W251bGwsMwxLDEwNCwi.
Schlage LiNK is now Nexia Home Intelligence, Schlage Lock Company, downloaded Jan. 20, 2012 https://play.google.com/store/apps/details?id=com.schlagelink.android&feature=search_result#?t=W251bGwsMSwxLDEsImNvbS5zY2hsYWdlbGluay5hbmRyb2lkll0.

* cited by examiner

*Primary Examiner* — Travis Hunnings
(74) *Attorney, Agent, or Firm* — Fitch, Even, Tabin & Flannery LLP

(57) ABSTRACT

A system, method, and computer program product determine when a user's mobile device has left a secured physical site, such as a house or office, without predefined site security settings being met, and responsively inform the user of any security anomalies. A predetermined distance threshold is compared with the distance between the mobile device, and a secured site. If the distance exceeds the threshold and a trigger event is detected, an alert is transmitted. The alert may be transmitted via the internet, and may be formatted as a text message, a phone vibration, a popup alert, a ringtone, an audio recording, a synthesized voice message, an image, and a video. The alert may be delivered via a speaker in a vehicle or a mobile phone, and an alert format is selected according to whether these are in use.

24 Claims, 2 Drawing Sheets

HANDS-FREE HOME AUTOMATION APPLICATION

FIELD OF THE INVENTION

This patent application relates in general to home automation systems, and more specifically to a home automation application that determines when a user has left a secured physical site without predefined security settings being met, and responsively informs the user of the security anomalies.

BACKGROUND OF THE INVENTION

Home security systems are widely known and have been used for some time. Sensors detect if a physical site, such as a home or office, is undergoing an event that should trigger an alarm. Sensors may detect glass breakage, electricity use or outage, smoke or fire, door openings, and many other events of concern. The security system may then sound an alarm at the site, and/or send a remote alarm signal indicating a security emergency to an external monitoring service, based on the input data from the sensors.

In many instances though, a security issue is not the result of an actual emergency situation, but merely the result of a physical site not being properly put into a predetermined secure condition. A homeowner may leave a house's door open that should be closed, and/or unlocked when it should be locked, or unintentionally leave a light on. Such situations should be brought to the user's attention for possible correction, but should not necessarily trigger an alarm. If the homeowner is still on the premises, there may be no need to put the house into a secured condition, as people are routinely coming and going. The need may arise only when the security system user is away from the house. This patent application provides a viable approach to solving this challenge and presents a practical implementation of that technique.

SUMMARY OF THE EMBODIMENTS

A system, method, and computer program product for automating site security are disclosed and claimed herein. An exemplary computer-implemented method embodiment may comprise comparing a predetermined threshold with a distance between a mobile device and a secured site, detecting a trigger event, and selectively transmitting an alert, based on the distance. The distance may be determined by GPS and/or cellular positioning.

The mobile device may comprise a vehicle and/or a mobile device. The secured site may comprise a house and/or an office. The trigger event may comprise a predefined security anomaly, including a movable barrier (e.g a gate, a door, or a garage door) and/or a light being in a condition other than a predetermined condition, such as locked or unlocked, open or closed, and lit or unlit.

The transmitting may comprise communication via the internet. The alert may be formatted as a text message, a phone vibration, a popup alert, a ringtone, an audio recording, a synthesized voice message, an image, and/or a video. The alert may be transmitted to a customer, the mobile device, a home automation cloud service, a security service, and/or security personnel.

The alert may be delivered via a speaker in a vehicle and/or a mobile phone, and an alert format may be selected according to whether the speaker in the vehicle and/or the mobile phone are in use. The method may further comprise acquiring instructions regarding a response to the trigger event from a customer, the mobile device, a security server, and/or security personnel. The instructions may be acquired by detecting a steering wheel pushbutton activation and/or a voice command. The condition of a movable barrier and/or a light may be changed, for example in response to the instructions. The acquired instructions may be executed by a home automation controller running a home automation application. The alert may be transmitted as a subscription based service.

A system embodiment may comprise a processor and a memory containing instructions that, when executed by the processor cause the processor to compare a predetermined threshold with a distance between a mobile device and a secured site, detect a trigger event, and selectively transmit an alert, based on the distance.

A computer program product embodiment may comprise a computer readable medium tangibly embodying non-transitory computer-executable program instructions thereon that, when executed, cause a computing device to compare a predetermined threshold with a distance between a mobile device and a secured site, detect a trigger event, and selectively transmit an alert, based on the distance.

As described more fully below, the apparatus and processes of the embodiments disclosed enable hands-free home automation applications. Further aspects, objects, desirable features, and advantages of the apparatus and methods disclosed herein will be better understood and apparent to one skilled in the relevant art in view of the detailed description and drawings that follow, in which various embodiments are illustrated by way of example. It is to be expressly understood, however, that the drawings are for the purpose of illustration only and are not intended as a definition of the limits of the claimed invention.

DETAILED DESCRIPTION OF EXEMPLARY EMBODIMENTS

Figure 1:
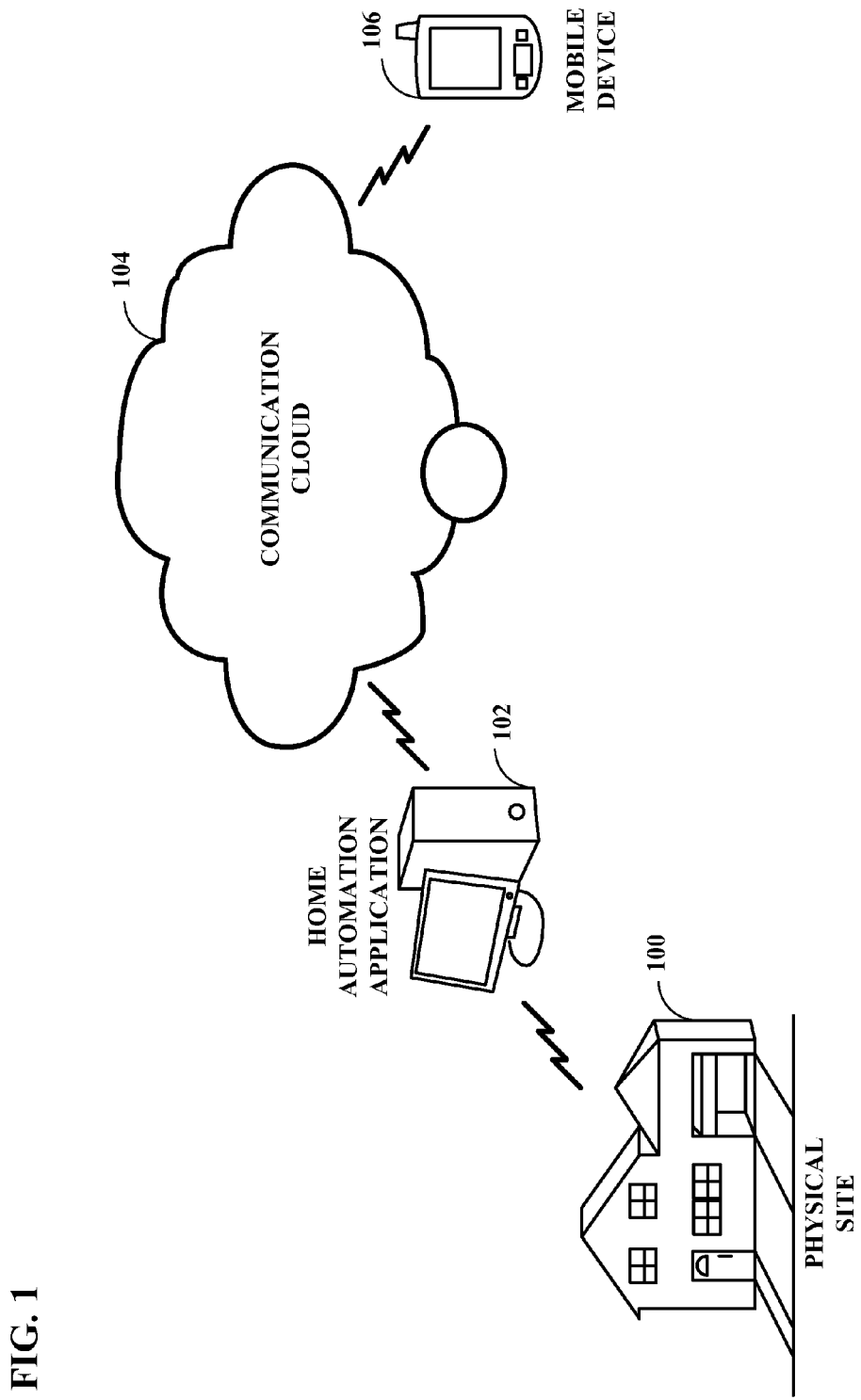
FIG. 1 depicts an overview of the arrangement of a physical site security system, according to an embodiment.

Referring now to FIG. 1, an overview of the arrangement of a physical site security system is shown. A physical site 100 is the premises to be secured, and may include a house or office, or any other similar site as may be conventionally known. A home automation controller may run a home automation application 102. The figure depicts application 102 as being run on a computer, but application 102 may be run by any consumer electronics device, such as a television set, home theater receiver, or Blu-ray player for example. The application may monitor various sensors throughout the premises, and may optionally be able to control the condition of various features of the premises. For example, application 102 may be able to lock and unlock and/or open and close movable barriers such as doors, gates, or garage doors, as well as turn lights on or off. Home automation application 102 is also capable of two-way external communication, preferably via the internet or other communication cloud 104.

Home automation application 102 communicates with mobile device 106, which may comprise a customer's vehicle or mobile phone for example. Mobile device 106 is capable of determining its geographic location through means known in the art, including but not limited to GPS and cellular positioning. Home automation application 102 stores the geographic location of the physical site to be secured in a memory, and compares this location to the location of mobile device 106 to determine a distance between the two. The distance is then compared to a predefined distance threshold. In this manner, home automation application 102 may determine if a user/customer has vacated the premises to be secured 100, or, conversely may determine if a user who had left is now returning.

Home automation application 102 has predefined settings to define various states of the premises that may be sensed by various sensors and optionally controlled, such as all doors closed and locked and all lights off, etc. These settings may be modified by the user as desired. If a user leaves premises 100, as determined by mobile device 106 moving beyond the distance threshold, home automation application 102 performs a test of its sensors to determine if there are any security anomalies. In this manner, home automation application 102 may determine that a user has left physical site 100 without the security settings being properly met, e.g. a door may have been left open or unlocked, etc. Generally speaking, application 102 checks to determine if any predefined security conditions are unmet. If so, and the user is not at the premises, a trigger event occurs.

Home automation application 102 responsively transmits an alert to the user. Note, this behavior differs from prior art security systems which may for example simply trigger an audible alarm and/or call a security service. Such false alarms are frequent and may result in fees charged to a user when there is no real emergency situation.

The alert may be transmitted via the internet to a customer, the mobile device, a home automation cloud service, a security service, and/or security personnel, depending upon settings entered into the application. The alert may be formatted as a text message, a phone vibration, a popup alert, a ringtone, an audio recording, a synthesized voice message, an image, and/or a video. The alert may be delivered via a speaker in a vehicle or a mobile phone, depending on user preferences and on whether such devices are currently in use.

For example, if a user's mobile phone is in use, the user may not appreciate an audio recording from application 102 interrupting a phone call, so a less obtrusive alert format may be selected. Similarly, if a vehicle's stereo speakers are in use, a phone vibration may be a better way to get the user's attention. The system in general attempts to notify rather than alarm a user that a security anomaly has been detected, as it may be more likely that a user simply left the premises somewhat unsecured than that an emergency situation is actually occurring.

Embodiments of the invention may go beyond simply notifying the customer that a security anomaly exists, they may also acquire instructions regarding a response to the trigger event. Such instructions could come from a customer, the mobile device, a security server, or security personnel. Application 102 may try to contact various alert recipients in order, typically by following a set of hierarchical alert instructions previously established by the customer. For example, the system could be implemented as a subscription service, wherein various levels of alerts and involvement of other parties may be differently priced. Alerts could go to the customer, and if no response is received, then for example a security service could be alerted. A three-way conversation between a customer, security personnel, and application 102 could be automatically arranged for a more detailed investigation of the security anomalies prior to dispatching security personnel to the physical site. Alternately, the user might program embodiments to automatically correct the security anomaly and send an alert to the user as a notice to be more security-conscious in the future.

Embodiments may acquire response instructions by detecting a steering wheel pushbutton activation or a voice command from the user. Even if no alert is sent, application 102 may also enter a listen mode when an appropriate phrase is spoken via the user's mobile phone. In any event, the accepted commands will allow a user to for example check the garage door, locks, and lights as currently open/closed, locked/unlocked, or on/off, etc., and enable the user to change any of these to the state desired. In this way, the security anomaly may be corrected or merely acknowledged in a hands-free manner. Alternately, a user may choose to escalate the security anomaly to a true alarm situation.

Application 102 may also have a set of customizable commands for certain common scenarios. An example would be a "coming home" scenario, which would open the garage, unlock the door, and turn on the lights. This command set could either be triggered by the user's position relative to his or her home address becoming more proximate, or by the user saying the appropriate command via hands-free voice recognition. Application 102 includes encryption and authentication features to ensure that only authorized users or customers may issue commands.

Figure 2:
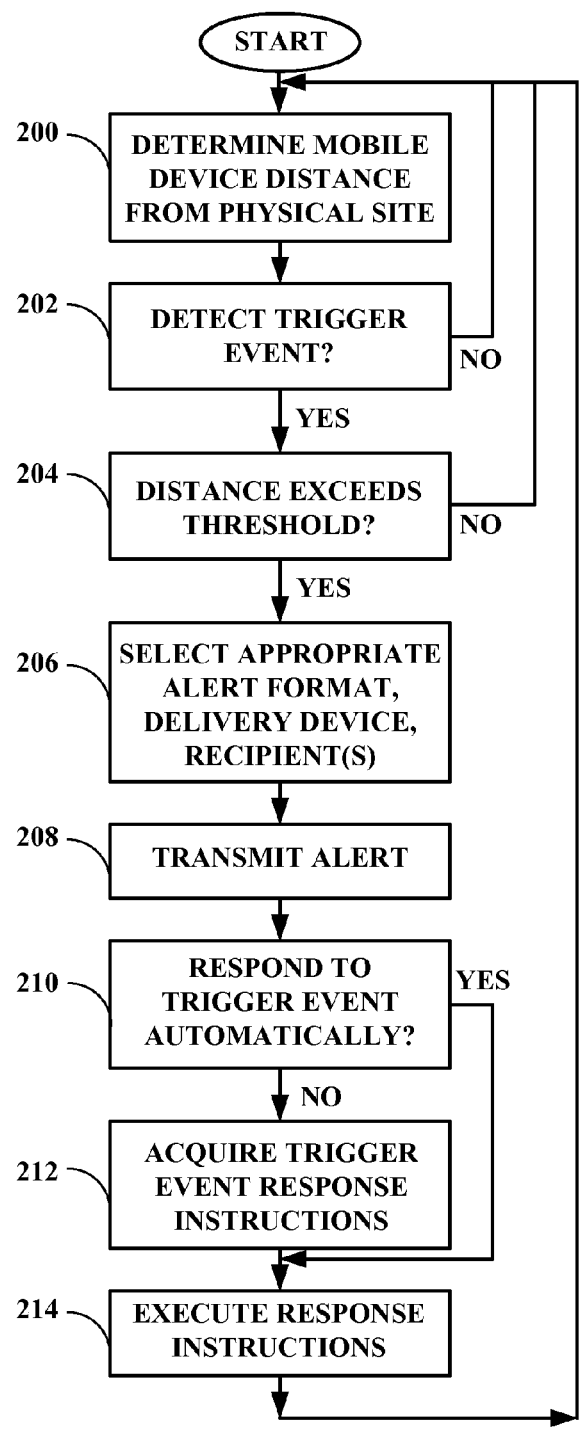
FIG. 2 depicts a flowchart of the operation of a physical site security system, according to an embodiment.

Referring now to FIG. 2, a flowchart of the operation of a physical site security system is shown. In this flowchart, the embodiments are presumed to be monitoring a departing user, but it is to be understood that the invention is not so limited. In step 200, application 102 determines the distance between physical site 100 and mobile device 106. In step 202, application 102 determines if a trigger event has occurred, which may for example comprise a security anomaly, and if so proceeds, otherwise returns to the distance determination. In step 204, application 102 determines if the distance between physical site 100 and mobile device 106 exceeds the predetermined threshold distance. If not, then operation returns to the beginning, but if so then an alert is warranted.

In step 206, embodiments process the alert to be transmitted. This includes determining the alert format to be used (e.g. a text message, a phone vibration, a popup alert, a ringtone, an audio recording, a synthesized voice message, an image, and/or a video). The appropriate delivery device is also determined (e.g. a vehicle's speakers, or a mobile phone or other mobile device). Finally, the appropriate recipients are also determined (e.g. a customer, the mobile device, a home automation cloud service, a security service, and/or security personnel). In step 208, the alert is transmitted, preferably via the internet, although other communication means are within the scope of the invention.

Beginning in step 210, the embodiments respond to the trigger event. If a user has for example set home automation application 102 to respond to a trigger event automatically without sending an alert, then operation may move to step 214 to execute the desired response instructions. Otherwise, in step 212 the embodiments acquire response instructions, for example by detecting a steering wheel pushbutton activation and/or a voice command from a user/customer. Finally, in step 214, the response instructions are executed by application 102.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, embodiments are described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments are essentially the code segments to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, etc. User input may include any combination of a keyboard, mouse, touch screen, voice command input, etc. User input may similarly be used to direct a browser application executing on a user's computing device to one or more network resources, such as web pages, from which computing resources may be accessed.

While the invention has been described in connection with specific examples and various embodiments, it should be readily understood by those skilled in the art that many modifications and adaptations of the embodiments described herein are possible without departure from the spirit and scope of the invention as claimed hereinafter. Thus, it is to be clearly understood that this application is made only by way of example and not as a limitation on the scope of the invention claimed below. The description is intended to cover any variations, uses or adaptation of the invention following, in general, the principles of the invention, and including such departures from the present disclosure as come within the known and customary practice within the art to which the invention pertains.

What is claimed is:

1. A computer-implemented method for automating site security, comprising:
   comparing a predetermined threshold with a distance between a mobile device and a secured site;
   detecting a trigger event; and
   selectively transmitting an alert from the secured site to the mobile device, based on the distance exceeding the predetermined threshold.

2. The method of claim 1 wherein the distance is determined using at least one of GPS and cellular positioning.

3. The method of claim 1 wherein the mobile device is a mobile phone.

4. The method of claim 1 wherein the secured site comprises at least one of a house and an office.

5. The method of claim 1 wherein the trigger event comprises a predefined security anomaly.

6. The method of claim 1 wherein the trigger event comprises at least one of a movable barrier and a light being in a condition other than a predetermined condition.

7. The method of claim 6 wherein the movable barrier comprises at least one of a gate, a door, and a garage door.

8. The method of claim 6 wherein the predetermined condition is at least one of locked, unlocked, open, closed, lit, and unlit.

9. The method of claim 1 wherein the transmitting comprises communication via the internet.

10. The method of claim 1 wherein the alert is formatted as at least one of a text message, a phone vibration, a popup alert, a ringtone, an audio recording, a synthesized voice message, an image, and a video.

11. The method of claim 1 wherein the alert is transmitted to at least one of a home automation cloud service, a security service, and security personnel if no response is received from the mobile device.

12. The method of claim 1 wherein the alert is delivered via at least one of a speaker in a vehicle and a mobile phone, and an alert format is selected according to whether at least one of the speaker in the vehicle and the mobile phone are in use.

13. The method of claim 1 further comprising acquiring instructions regarding a response to the trigger event from at least one of a customer, the mobile device, a security server, and security personnel.

14. The method of claim 13 wherein the acquiring comprises detecting at least one of a steering wheel pushbutton activation and a voice command.

15. The method of claim 13 further comprising changing the condition of at least one of a movable barrier and a light.

16. The method of claim 15 wherein the acquired instructions are executed by a home automation controller running a home automation application.

17. The method of claim 1 wherein the alert is transmitted as a subscription based service.

18. A system for automating site security, comprising:
   a processor; and
   a memory containing instructions that, when executed by the processor cause the processor to:
      compare a predetermined threshold with a distance between a mobile device and a secured site;
      detect a trigger event; and
      selectively transmit an alert from the secured site to the mobile device, based on the distance exceeding the predetermined threshold.

19. A computer program product for automating site security, comprising a non-transitory computer readable medium tangibly embodying non-transitory computer-executable program instructions thereon that, when executed, cause a computing device to:
   compare a predetermined threshold with a distance between a mobile device and a secured site;
   detect a trigger event; and
   selectively transmit an alert from the secured site to the mobile device, based on the distance exceeding the predetermined threshold.

20. A system for automating site security, comprising:
   means for comparing a predetermined threshold with a distance between a mobile device and a secured site;
   means for detecting a trigger event; and means for selectively transmitting an alert from the secured site to the mobile device, based on the distance exceeding the predetermined threshold.

21. The method of claim 1, further comprising receiving instructions from the mobile device to escalate the alert to a true alarm situation and transmitting the alert to a security service in response to receiving the instructions.

22. The method of claim 1, further comprising automatically correcting the trigger event, and wherein the selectively transmitting an alert further includes transmitting an alert from the secured site to the mobile device indicating that the trigger event has been automatically corrected.

23. The method of claim 1, wherein the detecting a trigger event further includes monitoring a plurality of sensors throughout the secured site.

24. The method of claim 1, further comprising providing a home automation application on a device at the secured site, and wherein the selectively transmitting an alert further includes transmitting an alert from the home automation application to the mobile device, the alert indicating that the trigger event has been detected.

* * * * *